March 5, 1957   H. M. ENNIS   2,784,385
SAFETY ELECTRIC COUPLING
Filed Feb. 2, 1954
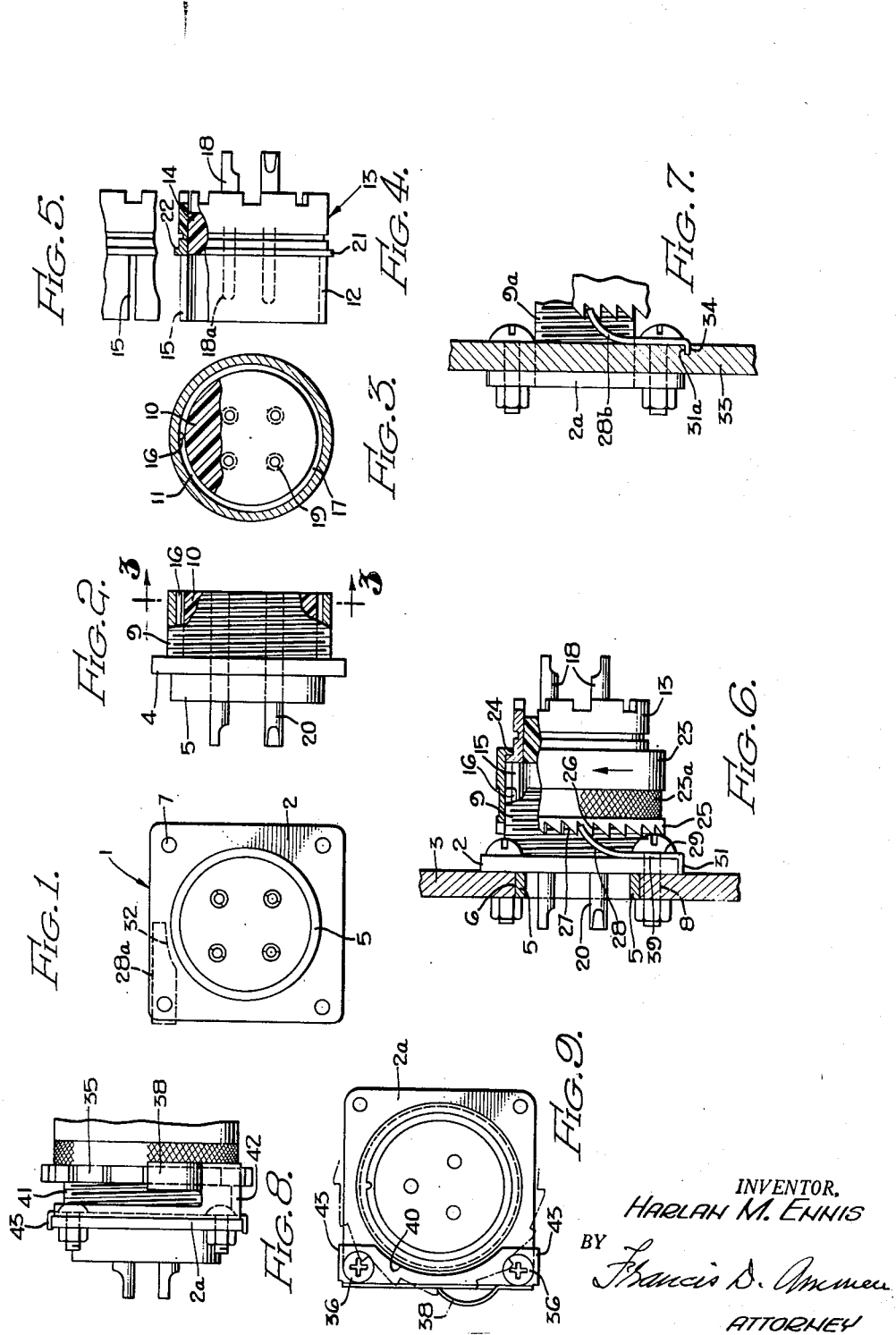
INVENTOR.
HARLAN M. ENNIS
BY
ATTORNEY United States Patent Office 2,784,385
Patented Mar. 5, 1957

2,784,385

SAFETY ELECTRIC COUPLING

Harlan M. Ennis, Eagle Rock, Calif.

Application February 2, 1954, Serial No. 407,776

2 Claims. (Cl. 339—89)

This invention relates to couplings particularly adapted for use in any kind of electric connections.

Couplings of this type are frequently used to connect a plurality of cables embodied in a common sheath, employed in electronic apparatus, or the like, though they are most extensively used for connecting cables on airplanes or on board ship.

It is the present practice on airplanes that employ electric couplings for this purpose, to employ two coupling-members each of which is provided with a tubular sleeve carrying an insulating block in which metallic connectors are carried. These conductors are respectively male and female. The two coupling members are telescoped together with the conductive connectors in alignment with each other. One of the coupling members is usually relatively fixed, and the other is moved up on a thread connection so as to draw the conductive connectors into complete and permanent contact with each other.

It is found in practice, however, that due to the vibration on airplanes, couplings constructed as just described frequently become loosened from the vibration and for this reason it is necessary to make quarterly inspection of all such couplings.

It has been attempted to overcome this loosening of such couplings due to vibration, by providing a small wire tie which is connected to some fixed part on one coupling member or relatively fixed coupling member which may be attached to some fixed point such as a fire bulk head or any other plate through which the cable connection must pass.

After securing the middle portion of the tie to such a fixed point, the two wires comprising the tie are then twisted together, and beyond the twist, the ends of the wire is then passed through an eye in one a plurality of lugs formed on the relatively movably coupling member; and the two free ends of the wire are then twisted together to complete the tie.

In practice, usually the relatively movable coupling member is provided with at least three lugs for this purpose, each lug carrying an eye, so that regardless of where the relatively movable coupling member finally stops in its tight position, there will always be a lug conveniently near the fixed point to facilitate the attachment of the tie in the manner described.

An object of the present invention is to provide electric couplings with simple but reliable means which will operate effectively to prevent any possibility of the coupling becoming loose when subject to vibrations.

Another object of the invention is to provide such means constructed so as to facilitate inspection of the coupling; to this end, the construction of the means employed in this invention is such that it can be applied at a plurality of points on the relatively fixed coupling member. On this account it can be applied as readily on either side of the fixed coupling member and also at the upper or under side. This insures that, regardless of the location of the point where the inspector stands, he can always see the coupling.

Another object of the invention is to provide circumferentially disposed teeth on one of the coupling members and to provide means to cooperate with the teeth, which is constructed in such a way that it can be secured to the other coupling member by a single bolt or screw, and at the same time, to form it in such a way that it locks itself in its operative position, and cannot be dislodged from that position by vibration.

Further objects of the invention will be readily apparent after a careful reading of the specification and a study of the accompanying drawing.

The invention consists in the novel parts and combinations of parts to be described hereinafter, all of which contribute to produce an efficient safety coupling for electric cables.

A preferred embodiment of the invention is described in the following specification, while the broad scope of the invention is pointed out in the appended claims.

In the drawing:

Figure 1 is an end elevation of a coupling member which in the present instance is provided with a flange for attaching it to the support for it.

Figure 2 is a side elevation of the coupling member shown in Figure 1 and omitting a pawl indicated in Figure 1, but displaying the threaded sleeve of this member which cooperates with the other coupling member shown separately in Figure 4. Figure 2 also shows the outer end of the sleeve portion broken away to show details of the insulating block within the sleeve.

Figure 3 is a section on the line 3—3 of Figure 2 with a portion of the insulating block broken away and shown in section. This view also shows the relation of the female connectors through which the current passes when the coupling is in its closed relation.

Figure 4 is a side elevation of the male coupling member with the upper portion broken away and shown partially in section, and illustrating the relation of the male connectors in this coupling member.

Figure 5 is a fragmentary view and is a plan of the top portion of the coupling member shown in Figure 4.

Figure 6 is a side elevation of the complete coupling member shown in Figure 1, fastened to a supporting plate through which the current carried in four cables can be passed through a supporting plate or bulkhead. In this view the upper portion of the male coupling member is broken away to show details of the male coupling member in the manner in which a threaded sleeve associated with it can draw the male member up on the threaded sleeve on the relatively fixed coupling member. This view also illustrates clearly a resilient locking member that I employ to cooperate with a ring of teeth on the outer coupling sleeve that is associated with the inner portion or core of the male coupling member shown in Figure 4.

Figure 7 is a fragmentary view showing a second manner of mounting the flange of the relatively fixed member on the inner side of the wall or plate such as shown in Figure 6.

Figure 8 is a fragmentary view of a modification, and is a side elevation of a coupling such as shown in Figure 6, but this view merely shows the same end of the coupling without showing any of the coupling in section.

Figure 9 is an end elevation of the parts that are shown in Figure 8. This view shows the curved portion of the pawl and also shows the outwardly projecting teeth with which the pawl cooperates to prevent the other coupling member from backing off from the flanged coupling member when subjected to vibration.

In the present instance by way of explanation, the coupling illustrated includes a relatively fixed coupling member 1 which is usually provided with a flange 2 for securing the same to a support such as a fixed plate which would be present in a bulkhead or other wall 3.

On the outer side or seat face 4 of the flange 2 a short sleeve or circumferential neck 5 is provided to fit into an opening 6 in the plate 3 at which the coupling is to be supported.

Also in the present instance the flange 2 is of square form, but the shape of this flange is, of course, unessential. However, the flange affords means for securing the coupling member 1 to the plate 3, in case the coupling member must be attached to such a support, and in that case the flange is provided with a plurality of bolt holes 7 located singly at the corners of the flange to receive screw bolts 8 respectively (see Figure 6) for securing the same in place.

This coupling member 1 also has an externally threaded sleeve 9, and supports within it an insulating block 10, which is secured at its inner side to the inner face of the flange 2 by any suitable means not illustrated. The diameter of this block 10 is considerably less than that of the bore 11 of this sleeve (see Figure 3) to enable it to receive the inner end 12 of the part 13 of the second coupling member (see Figure 4) which is also of sleeve form, and within the bore of which the insulating block 10 is received. The right hand end portion of the sleeve 13 is also provided with an insulating block 14 (see Figure 4). On a single point on its periphery the inner portion 12 of the coupling member 13 is formed with a longitudinally disposed slot 15, and when the left hand end portion 12 of sleeve 13 telescopes into the threaded sleeve 9 of the other coupling this slot 15 receives an inwardly projecting bead 16 (see Figures 2 and 3) that is integrally connected with the wall of this sleeve. In other words, this bead projects into the annular space 17 between the insulating block 10 and the wall of the threaded sleeve 9, and when the end portion 12 telescopes with the threaded sleeve 9 the bead 16 passes relatively into the slot 15. In other words, this is the means preferably provided when applied to couplings of this kind for maintaining alignment of the terminals 18 of the second coupling member wtih the corresponding female terminals or sockets 19 of the terminals 20 in the first named coupling member 1.

Couplings of this type are also usually provided with an external circumferential rib 21 (see Figure 4) that presents a shoulder 22 facing towards the outer end of the sleeve 13 that forms a part of the second coupling member.

The second coupling member also includes an outer sleeve 23 (see Figure 6) and the rear end of this sleeve 23 is provided with an inwardly projecting flange 24 that rides on the shoulder 22, and this outer sleeve is provided at its inner edge with a series of exposed teeth 25 that are inclined, with relatively abrupt shoulders 26 on their rear faces with respect to the direction or rotation of the outside sleeve 23 when the coupling is being closed. The forward edges 27 of these teeth 25 are inclined rearwardly to the outer ends of the shoulders 26 so as to facilitate their cooperating with a yielding or resilient detent pawl 28, extending in a transverse plane, and the tip of which (as illustrated in Figure 6) projects upwardly into the acute angles formed between the inclined edges 27 of the teeth and their abrupt shoulders.

This detent pawl is considerably resilient, and preferably of steel. As shown in Figure 6, it has a shank 29 that seats against the outer face of the flange 2 and as this shank extends upwardly and toward the series of teeth 25 it blends into a curved portion, shown in Figure 6, and the tip of which rides relatively in a circumferential path, and engages the angles between the teeth as the coupling is being rotated to its closed position.

This detent pawl has a single opening 30 through its shank 29 which receives one of the screw bolts 8 that secures the flange in position. In this way I employ a fastener for the pawl, that is a separate piece, distinct from the piece that is the pawl. I form this detent pawl with means for holding it in a fixed position on the coupling member 1. In the present instance, I accomplish this by providing the shank 29 with a lateral bent fin 31 that engages the edge face of the flange 2. In Figure 2 I do not show the location of this detent pawl, but I show an identical pawl to the pawl 28 in Figure 1 by means of the dotted lines 28a. The pawl illustrated at 28a is shown from another side so as to indicate a cut back side edge 32 adjacent the tip of the curved portion. This cut back edge gives clearance for the teeth and adapts the pawl more effectively to perform its function of preventing a backward rotary movement of the outer sleeve 23 after the coupling member part 13 has been drawn up tightly into position, at which time the stem portions 18a of the terminals 18 will have been shoved home in the openings 19 of the female socket terminals 20.

The outer coupling sleeve 23 is preferably provided with a milled zone 23a to facilitate screwing this sleeve up on the externally threaded sleeve 9, and once in place and tightened up, it will be evident that no vibrations of the closed coupling can possibly dislodge the tip of the pawl 28 from the teeth.

While one of the coupling members of this coupling has been illustrated as having a form enabling it to be attached to a support, it should be understood that my invention is not limited in use to a situation where one of the couplings must be supported in this way. In other words, in some situations such a multiple cable type of coupling could be employed in which the closed coupling would lie upon a supporting shelf or floor, in which case the flange 2 might still be provided; and it would be provided with four bolt openings such as the bolt openings 7 spaced 90 degrees apart around the perimeter of the flange. The advantage of this is that having these three extra bolt holes spaced as they are enables the detent pawl 28 to be placed on either side of the coupling or on the lower edge or upper edge of the flange. In this way the pawl can always be located where it can readily be observed from the position an inspector would have; for example, if the cable coupling is overhead the pawl can be on the under side of the coupling; and attached in either one of the holes 7 adjacent the lower edge of the flange, whichever hole is better adapted to facilitate the inspection.

In Figure 7 I illustrate in a somewhat diagrammatic manner another way in which the relatively fixed coupling could be secured, and that is, by placing the flange 2a of the coupling on the left side of the plate as viewed in Figure 7. In such a situation the pawl 28b is seated against the face of the plate 33 from which the external threaded sleeve 9a projects. And in order to hold the pawl fixed, a short slot 34 should be cut in the face of the plate to receive a bent end or flange 31a on the pawl as shown.

In Figures 8 and 9 I illustrate another embodiment of the invention in which the series of teeth 35 extend outwardly in a plane at right angles to the axis of rotation of the coupling member that carries the teeth or serrations. In this case I prefer to use two bolts 36 and 37 to secure a pawl 38 to the flange 2a of the relatively fixed coupling member. Also, in this case, the pawl body is formed with a vertically elongated base plate 39 which seats against the face of the flange 2a that is adjacent to the teeth 35. This plate 39 has an arcuate inner edge 40 that conforms to the curved side of the threaded sleeve 41 of this flanged coupling member. And as shown in Figure 8, this pawl 38 is formed as a curved extension that projects upwardly from a foot 42 that extends laterally in a horizontal plane, as clearly shown in Figure 8. The upper edge of this foot extension 42 integrally carries the curved body of the pawl 38 preferably curved as shown in Figure 9. If desired, the upper and lower edges of the plate portion 39 of this pawl are provided with lateral extensions 43 that lie against the upper and lower edges of the flange, and using these end flanges or fins 43 makes this connection doubly secure.

Many other embodiments of this invention may be resorted to without departing from the spirit of the invention.

I claim and desire to secure by Letters Patent:

1. In a coupling for an electric cable having a pair of coupling members, the first of which has an externally threaded sleeve and the second coupling member has an internally threaded sleeve meshing on the externally threaded sleeve for advancing the forward edge of the internally threaded sleeve when rotated in a direction to close the coupling, a plurality of spaced apart insulated contact terminals in alignment with each other, respectively, and guided to maintain said alignment when the internally threaded sleeve is rotated to bring the contacts together to close a plurality of circuits through said contacts, the combination of circumferentially disposed ratchet teeth located adjacent the forward edge of the internally threaded sleeve, and a detent pawl carried by the first named coupling member disposed in a transverse plane into which the said teeth arrive in the latter part of the closing movement of the coupling, thereby enabling the pawl to ride over the said teeth and to cooperate with the same to lock the internally threaded sleeve against rotation in a backward direction that could loosen the coupling.

2. In a coupling for an electric cable having a pair of coupling members, according to claim 1, in which the said detent pawl includes a plate portion secured to the first coupling member and has a lateral extension for engaging said teeth and operating to prevent the said coupling member from backing off of the thread connection.

References Cited in the file of this patent

UNITED STATES PATENTS

| | | |
|---|---|---|
| 819,702 | Murphy | May 1, 1906 |
| 1,269,532 | Gasser | June 11, 1915 |
| 1,958,344 | Kretschmar | May 8, 1934 |
| 2,443,975 | Baker | June 22, 1948 |
| 2,491,406 | Zeeb | Dec. 13, 1949 |
| 2,513,080 | Burtt | June 27, 1950 |

FOREIGN PATENTS

| | | |
|---|---|---|
| 616,335 | Great Britain | Jan. 20, 1949 |